Dec. 7, 1954   E. BENCETTI   2,696,548
ELECTRIC BULB APPARATUS FOR DISTRIBUTING SUBSTANCES
SUITABLE FOR AMELIORATING AND/OR DISINFECTING
THE AIR AND/OR INSECTICIDES
Filed Aug. 3, 1950   2 Sheets-Sheet 1
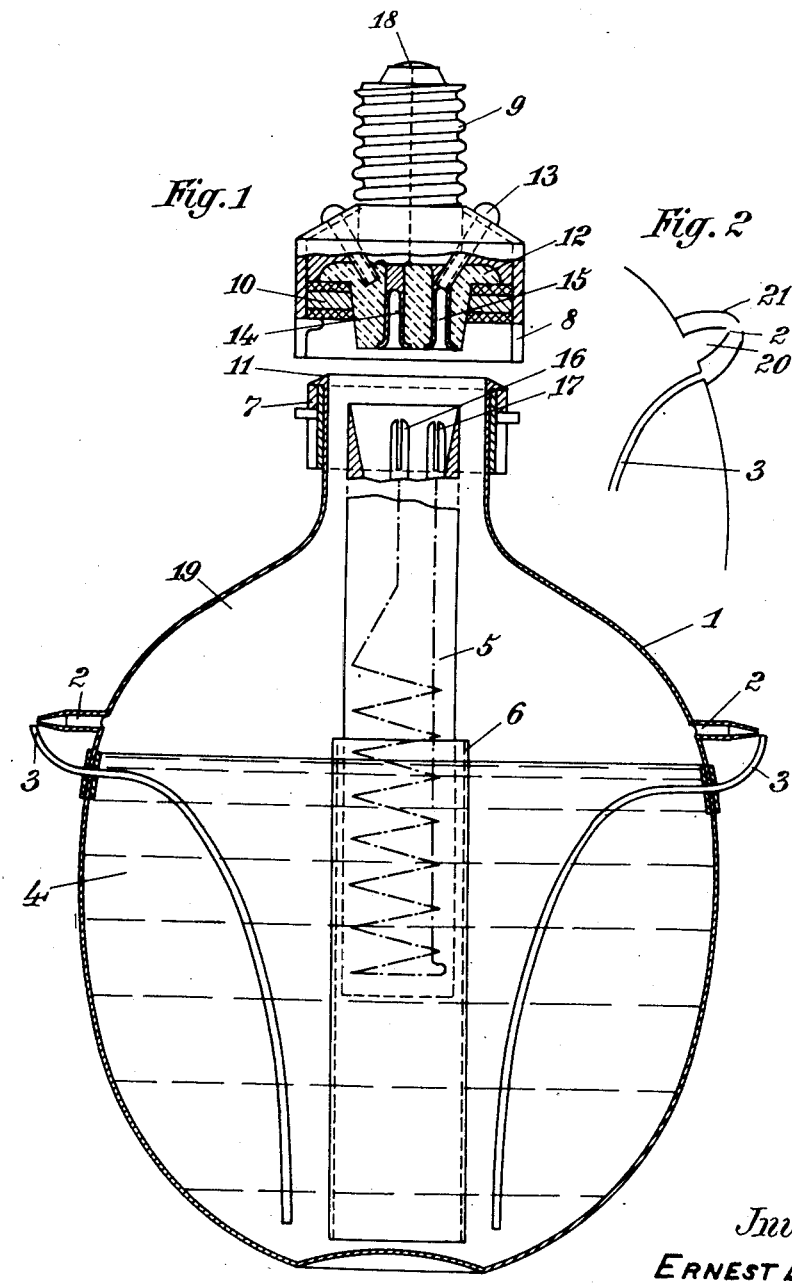
Inventor:
ERNEST BENCETTI
By Young, Emery & Thompson
Attorneys

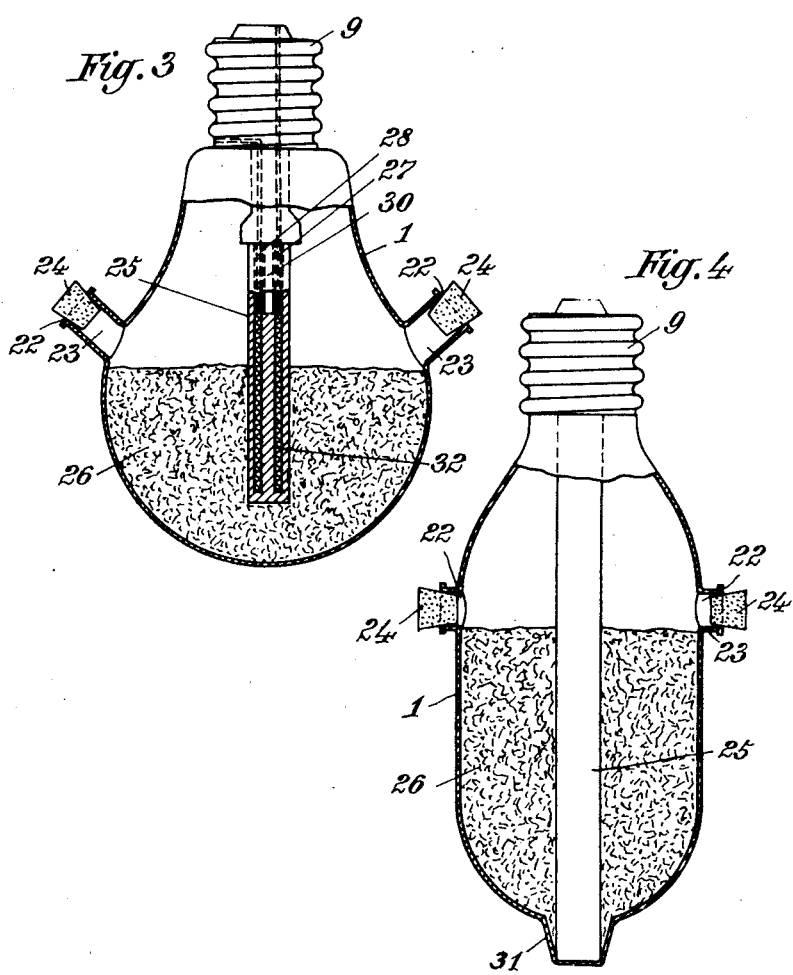

United States Patent Office 2,696,548
Patented Dec. 7, 1954

2,696,548

ELECTRIC BULB APPARATUS FOR DISTRIBUTING SUBSTANCES SUITABLE FOR AMELIORATING AND/OR DISINFECTING THE AIR AND/OR INSECTIDES

Ernest Bencetti, Furth, Germany, assignor of one-half to Firma Bruckbauer & Gotz, Nurnberg, Germany Application August 3, 1950, Serial No. 177,532

Claims priority, application Germany August 13, 1949

6 Claims. (Cl. 219—38)

This invention relates to an apparatus for distributing substances suitable for deodorizing and/or disinfecting the air, to exterminate noxious insects and the like in spaces, especially in assembly rooms, sick-rooms or the like.

Sprinkling or spraying apparatus are known in which the liquid may be emitted from a container by means of a pump piston. Such apparatus which, generally, are operated by hand require a relatively great number of pump strokes for spraying a sufficient quantity of spraying liquid within a space. The operation of such apparatus is rather difficult and time-consuming, further such apparatus causes much disagreeable noise. For all these reasons they cannot be used generally in a sufficient measure in play-houses, cinemas, assembly-rooms and so on. It must be added that the liquid is sprayed with rather large droplets whereby a very large amount of liquid must be used. Besides, the effectiveness of the sprayed liquid is restricted because the droplets fall rapidly the greater the size and, therefore, become inefficient.

Further apparatus are known rendering it feasible to moisten and to deodorize air by vaporizing the liquid. Such apparatus, known as so-called smoke-consumers, are not suitable for voluminous assembly-rooms, for sick-rooms and the like where as much active mass as possible must be atomized very rapidly, because vaporization does not take place sufficiently rapidly to furnish enough active mass of vapor to obtain the desired amount and rapidity of deodorizing or disinfecting.

It has also been suggested to disinfect i. e. to free rooms from noxious insects or animals such as flies, gnats, bugs and so on by burning materials suitable for extermination of noxious animals and plant sickness in form of powder or tablets on a support f. i. a plate for the purpose to kill the noxious insects or animals by the smoke generated in the respective space. This method is complicated and primitive and has the disadvantage that there is a fire hazard due to insufficient attention and that often a suitable plate is not available.

According to the invention all mentioned disadvantages may be avoided by an apparatus in which the substances are sprayed from a container by the evaporative pressure produced by an electric heating device adapted to be connected to an electric circuit f. i. with the lighting mains and projecting into the contents of the container. Such apparatus may be constructed as a liquid spraying device in which a liquid is sprayed by the evaporative pressure of a heated liquid. Preferably the spraying liquid is ejected from its container by its own evaporative pressure. It is, therefore, not necessary to heat another liquid for atomizing the spraying liquid, but one and the same liquid may be used for producing the evaporative pressure as well as for spraying.

It is preferable to have the vapour escaping in the form of a jet from its vaporizer thereby sucking up or priming the spraying liquid according to the principle of an ejector. If only one liquid is used as stated above the liquid container is partially filled with atomized liquid while the evaporation space arranged above the space filled with the spraying liquid is provided with exit openings coacting with openings in the form of tubes projecting into the space containing the spraying liquid.

It is of special advantage to heat the liquid electrically, preferably according to the principle of an immersion boiling device, and to construct the heating device in such a way that the apparatus may be connected with a suitable socket of a current conduit, preferably the lighting mains, by means of a holder similar to an incandescent bulb. In this case the immersion boiling device may project into a sleeve inserted into the liquid container space filled with atomized liquid, the inner width of which sleeve being only a trifle greater than the thickness of the immersion boiling device. Suitably this sleeve is open on its lower end while its upper end projects over the liquid level. For facilitating the filling operation the socket may suitably be detachably connected with the liquid container f. i. by means of a bayonet catch.

The spraying apparatus according to the invention need not be operated by hand. It operates noiselessly. Therefore, it may be set to work in play-houses and other assembly-rooms also during the performances, during the delivering of lectures and so on without disturbing anyone. As the apparatus may be connected with lighting mains as an incandescent lamp it may also be switched on and off similar to an incandescent lamp by means of a switch. It is, therefore, also characterized by being easily operated. A special advantage of the apparatus is that its effectiveness is a very intensive one as on the one hand vapour is blown out into the respective space and on the other hand liquid is atomized and sprayed. The vapour as well as the atomized liquid contains the deodorizing or disinfecting active substances. Besides, the liquid is very finely atomized, a quick enrichment of the air with active mass is possible with a small consumption of liquid. It is preferable that the vapour is intimately mixed with the air and, therefore, a considerably more intensive moistening of the air takes place than would be the case if the liquid is employed only in the form of sprinkled droplets.

However, the apparatus according to the invention has still other advantages. It is also distinguished over the known apparatus by its simple construction and its improved effectiveness in so far as the immersion boiling device heating and atomizing the liquid may be removed and inserted together with the connecting socket. In consequence of the sleeve encasing the immersion boiling device the heat of the heating body acts on the liquid existing between the sleeve and the heating body so that only that portion of the liquid is heated and vaporized while the other contents of the container remain essentially cooler. Therefore, the apparatus does not require a lengthy preheating and is relatively economical with respect to the consumption of electric current. This effect may be accentuated by manufacturing the sleeve of the immersion boiling device of a heat insulating material.

A further development of the described suggestion according to the invention is possible by operating the spraying apparatus with solid substances. In certain cases it is not desired to ameliorate or disinfect the air by means of liquid spraying substances for the reason that an increase of the moisture contents of the air is impracticable or that the very small liquid droplets sinking down are disadvantageous.

Surprisingly the idea of the invention may be realized in such a way that solid spraying substances may be heated in the container of the apparatus so far that they rise up as smoke. Particles of the solid spraying substances are changed by vaporizing into the gaseous state. If a closed container with exit openings is used the gas endeavours in consequence of the evaporative pressure to escape from the container openings provided for that purpose with a considerable speed and primes or carries away the smallest particles of the solid spraying substance. When streaming out into the open air the gas is considerably cooled so that it condenses or—so to say—sublimates. Thereby fine spraying particles are formed which is not by pulverization. The spraying substance mixture, therefore, has an increased capacity by being suspended in mid-air and therewith a sufficient activity for a long time.

It is recommended to provide an electric heating device also in such apparatus and to encase the filaments of the heating body with a protective casing separating at least the heating body from the spraying substance.

In this way chemical decompositions of the spraying substance by the filaments may be prevented. The protective casing should consist of a material which is not chemically influenced by the spraying substance, preferably it is manufactured from a ceramic material.

For fixing the heating body or its casing preferably a cavity may be provided on the bottom of the container into which the heating body with the casing may be inserted the other end of the heating body being held by the socket serving for connecting it with the supply of current.

The drawing shows by way of example two embodiments of the invention.

Fig. 1 shows a longitudinal section through an apparatus having a pear-shaped liquid container, Fig. 2 illustrates a spraying device of another construction, Figs. 3 and 4 are two different constructions of an apparatus burning up or rising up the substance as smoke.

The container 1 consisting preferably of glass is provided above the level of the liquid 4 with small pipes 2 containing exit openings, and coacting ejector-like with small pipes 3 projecting suitably up to the vicinity of the bottom of the container.

Into the spraying liquid 4 the heater 5 is inserted encased by the sleeve 6. The inner diameter of this sleeve is only somewhat greater than the outer diameter of the heating body 5 which is preferably spirally wound. The sleeve suitably consists of a heat insulating material and terminates below in a certain distance from the bottom of the container and projects on the upper side somewhat over the liquid level so that the vapour produced therein may escape into the vaporizing room without hindrance, while on the other hand the liquid may flow into the inner of the sleeve without hindrance.

The pear-like container 1 is adapted to receive a ring 7 on its neck fitting into the bayonet ring 8 of the socket 9 of an incandescent lamp. In the inner of this socket a rubber ring 10 is provided which is engaged by the upper edge 11 of the container neck thereby securing a tight closing of the container.

In the inner surface of the socket 9 which is suitably enlarged as a hood, as shown in Fig. 1, the flange 12 joins the rubber ring 10 and is fixed to the socket 9 by means of screws 13 or other suitable supporting means. This flange may serve to support the electric sockets 14 and 15 into which the pins 16 and 17 of the heating body may be inserted.

The electric current sockets 14 and 15 are connected with the connections of the socket 9, the one connection being the screw 13 and the body of the socket while the other connection is made over the usual contact button 18 of the socket.

If the apparatus is connected with the electric circuit vapour accumulates in the space 19, said vapour escaping through the exit openings 2 with a considerable overpressure. As it blows by the mouth of the small pipes 3 a suction effect is caused in these pipes. Therefore, spraying liquid is sucked from the space of the container containing the spraying liquid 4 and ejected with a great speed and thereby atomized.

Naturally the injector-like device may also be constructed in any other way. So, f. i., it is possible to provide a mamelonated construction according to Fig. 2 instead of the acute, pin-like exit pipes 2 shown in Fig. 1. In this case the exit opening 2 is provided on the end of a steam jet pipe 20 provided inside the mamelon 21. The jet pipe 20 is therefore encased by a mamelonated chamber connected with the small pipe 3 projecting into the space of the container containing the spraying liquid as already stated above. This construction has the advantage that the ejector consists of a closed mamelonated body which is less sensible towards jars or blows and therefore more resisting to fracture.

In a modified construction of the embodiment according to Fig. 2 the pipe 3 may be arranged in the middle of the mamelon so that the vapour flows through the annular cross section around said pipe within the mamelon thereby sucking the liquid from the mouth piece of the pipe 3 arranged in the middle.

The invention may be employed with spraying apparatus of all kinds. Especially it may be used for spraying apparatus in rooms, in which often numerous people or sick persons are staying, f. i. playing-rooms, cinemas, schools, assembly-rooms, boarding houses, sick-rooms, waiting-, dancing-, reciting-rooms and so on. Naturally the use of the apparatus according to the invention is not restricted to the mentioned cases. Such apparatus may also be used for extermination of noxious animals and plants in the household as well as in stables or in horticultural activities.

For such cases especially the apparatus according to Figs. 3 and 4 are suitable.

The glass container 1 of the embodiment shown in Fig. 3 is also formed like an incandescent lamp and preferably manufactured from an old, worn out incandescent lamp 9. It is provided with openings 22 preferably arranged on a neck 23 which openings may be closed by plugs 24. Through these openings 22 the substances to be distributed escape under the evaporative pressure. They form a kind of cloud around the spraying apparatus, said cloud increasing and extending the more the longer time the apparatus is connected with the electric current of the lighting mains.

Into the suitably pulverized or tablet-like spraying substance 26 the heating device projects consisting essentially of the heating body 32 and the casing 25 encasing it, said casing consisting, as already stated, of a fire-proof material chemically non-reacting upon the spraying substances. The heating body 32 suitably consisting of a heating spiral is connected with the two feeding wires 27 and 28 electrically connected with the socket 9.

The embodiment according to Fig. 3 starts from the bulk 1 of an old, used incandescent lamp. In this case the heating body is preferably arranged on the glass rod 30 partially remained standing and previously used for supporting the filament of the incandescent lamp.

In the embodiment shown in Fig. 4 an elongated container 1 is provided having on its upper end a socket 9 similar to the socket of an incandescent lamp. The heating body encased by a casing 25 is inserted into a cavity 31 on the bottom of the container while its upper end is held by the socket 9. Also in this case the heating body consists of a heating spiral encased by a casing 25 of fire-proof ceramic material. This construction has the advantage that the container may receive a relatively big quantity of spraying substance in consequence of its elongated shape and, therefore, is ready for operation for a long time. Further, the heating body has a greater active surface and therefore an improved spraying effect.

By the embodiments of Figs. 3 and 4 the spraying devices shown in Figs. 1 and 2 are changed to smoke producing devices and therefore, may be used for the disinfection of rooms and extermination of noxious animals and plants with special advantage. Corresponding to the quality of the spraying substances also these smoke producing devices may be used for deodorizing the air. Naturally they may be used standing as well as hanging.

What I claim is:

1. An apparatus for distributing substances for deodorizing and/or disinfecting the air and the like comprising a container for the substances to be distributed, said substances filling only a portion of the container to present a space above the level thereof, an electric immersion heater device immersed in said substance and adapted to vaporize them, means on the upper part of the container to connect the apparatus to a source of electric current and electrically connected with the heater device and openings provided in said container just above the level of the substances for issuing the said substances in a vaporized state and being in the working position of the apparatus above the level of the said substances, the vaporized substances being issued through said openings by the vapor pressure produced in the said space by the vaporisation, and a sleeve mounted around the electric device to surround the latter and which projects just above the liquid level at one end and is just above the bottom of the container at the other end so that the sleeve is open at the bottom.

2. A fluid atomizing apparatus according to claim 1 in which a cap and holder connection with pins and sockets is provided between the connection to the source of current and the heater.

3. A fluid atomizing apparatus according to claim 1 in which a cap and holder connection with pins and sockets is provided between the connection to the source of current and the heater, and in which a bayonet slot connection is provided adjacent the cap and holder connection to disconnect the apparatus from the source of current.

4. A fluid atomizing apparatus according to claim 1 in which a cap and holder connection with pins and sockets is provided between the connection to the source of current and the heater, and in which a bayonet slot connection is provided adjacent the cap and holder connection to disconnect the apparatus from the source of current, said connection including means to form an air tight connection between the source of current and the apparatus.

5. A fluid atomizing apparatus according to claim 1 in which at least one pipe is provided in the container having one end near the bottom of the container and the other end adjacent the nozzle to act as an atomizer.

6. An apparatus for vaporizing and atomizing substances comprising a container in the form of a bulb and having at least one outlet for the vaporized and atomized substance, an electric socket at one end of the bulb having a screw-threaded portion for connection in an electric outlet and a pin and socket connection connected to the screw-threaded portion, and an electric heater connected to the pin and socket connection and extending into the bulb toward the other end thereof and effective directly on the substance to be filled into the bulb which is to be vaporized and atomized.

References Cited in the file of this patent

UNITED STATES PATENTS

| Number | Name | Date |
|---|---|---|
| 1,459,307 | Laise et al. | June 19, 1923 |
| 1,544,212 | Blaschke | June 30, 1925 |
| 1,554,219 | Kitchen | Sept. 22, 1925 |
| 1,565,500 | Ritter | Dec. 15, 1925 |
| 1,707,453 | Winograd | Apr. 2, 1929 |
| 1,803,334 | Lehmann | May 5, 1931 |
| 1,836,247 | Hills | Dec. 15, 1931 |
| 1,913,571 | Strongsen | June 13, 1933 |
| 2,076,709 | Deutsch | Apr. 13, 1937 |
| 2,243,669 | Clyne | May 27, 1941 |
| 2,296,814 | Ebert | Sept. 22, 1942 |
| 2,454,657 | Kuzmin et al. | Nov. 23, 1948 |